(12) United States Patent  (10) Patent No.: US 8,184,229 B2
Nagaoka et al.  (45) Date of Patent: May 22, 2012

(54) LIQUID CRYSTAL DISPLAY DEVICE

(75) Inventors: Masafumi Nagaoka, Chiba (JP);
Kazuyoshi Tanaka, Mobara (JP); Akio Tezuka, Mobara (JP); Takayuki Ota, Ooamishirasato (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 51 days.

(21) Appl. No.: 12/222,151

(22) Filed: Aug. 4, 2008

(65) Prior Publication Data

US 2009/0040417 A1  Feb. 12, 2009

(30) Foreign Application Priority Data

Aug. 7, 2007  (JP) .................................. 2007-205351

(51) Int. Cl.
*G02F 1/13333* (2006.01)

(52) U.S. Cl. .......................................... 349/58; 349/56
(52) U.S. Cl. .............................................................
(58) Field of Classification Search ................. 349/56, 349/58
See application file for complete search history.

(56) References Cited

U.S. PATENT DOCUMENTS

| | | | | |
|---|---|---|---|---|
| 7,101,055 | B2 * | 9/2006 | Hsieh et al. | 362/29 |
| 7,259,964 | B2 * | 8/2007 | Yamamura et al. | 361/697 |
| 7,488,104 | B2 * | 2/2009 | Hamada et al. | 362/616 |
| 7,663,730 | B2 * | 2/2010 | Shibata | 349/161 |
| 2006/0132699 | A1 * | 6/2006 | Cho et al. | 349/161 |
| 2007/0153548 | A1 * | 7/2007 | Hamada et al. | 362/615 |
| 2007/0182884 | A1 * | 8/2007 | Lin et al. | 349/65 |
| 2007/0211205 | A1 * | 9/2007 | Shibata | 349/161 |

FOREIGN PATENT DOCUMENTS

| | | |
|---|---|---|
| CN | 1818762 A | 3/2006 |
| JP | 7-335015 | 6/1994 |
| JP | 10-96920 | 9/1996 |
| JP | 2005-84270 | 9/2003 |

* cited by examiner

*Primary Examiner* — K. Cyrus Kianni
(74) *Attorney, Agent, or Firm* — Stites & Harbison, PLLC; Juan Carlos A. Marquez, Esq

(57) ABSTRACT

A liquid crystal display device includes a liquid crystal display panel and a backlight arranged on a back surface of the liquid crystal display panel, the backlight including a plurality of rod-shaped light sources, a frame which supports the rod-shaped light sources, and a heat radiation plate which is arranged on an inner surface of the frame. Through holes are formed in the frame, and heat radiation fins are formed on the heat radiation plate in a state that the heat radiation fins project toward a back surface of the liquid crystal display panel through the through holes formed in the frame. Due to such a constitution, it is possible to provide a liquid crystal display device which can enhance heat radiation efficiency.

9 Claims, 5 Drawing Sheets

LIQUID CRYSTAL DISPLAY DEVICE

CROSS-REFERENCE TO RELATED APPLICATION

The present application claims priority from Japanese application JP2007-205351 filed on Aug. 7, 2007, the content of which is hereby incorporated by reference into this application.

BACKGROUND OF THE INVENTION

1. Field of the Invention

The present invention relates to a liquid crystal display device, and more particularly to a liquid crystal display device having a so-called direct-type backlight.

2. Description of the Related Art

With respect to a liquid crystal display device, along with a demand for large-sizing of a liquid crystal display panel, as a backlight, a so-called direct-type backlight which can make a planar light source uniform has been used.

The backlight is constituted of a plurality of rod-shaped light sources formed of, for example, fluorescent lamps which are arranged parallel to each other in plane which faces the liquid crystal display panel in an opposed manner, a frame which supports these rod-shaped light sources, and a reflection sheet which is arranged on a surface of the frame which supports the rod-shaped light sources.

In such a case, for preventing the heat generated by the rod-shaped light sources from being stored in the inside of the liquid crystal display device, it is necessary to radiate the generated heat to the outside of the liquid crystal display device.

For example, semiconductor devices for driving respective pixels of a liquid crystal display panel are incorporated in the inside of the liquid crystal display device. Such radiation of heat is necessary for avoiding the deterioration of properties of the semiconductor device by heat.

In view of the above-mentioned circumstance, there has been known a liquid crystal display device which arranges a heat radiation means having heat radiation fins on a surface of the above-mentioned frame of the backlight on a side opposite to the liquid crystal display panel. A liquid crystal display device having such a constitution is disclosed in JP-A-2005-84270, for example.

SUMMARY OF THE INVENTION

However, the above-mentioned liquid crystal display device is configured to allow a heat radiation means to radiate heat generated by the fluorescent lamps by way of the frame.

This implies that, with respect to the above-mentioned frame, when priority is assigned to a function to be performed by the frame, the selection of a material of the frame is limited and hence, there may be a case that the frame is required to be made of a material which exhibits unfavorable thermal conductivity.

Under such circumstances, the material of the heat radiation means is desirably a material which exhibits excellent heat conductivity in all heat conduction paths thus enabling the radiation of heat without interposing the frame.

Accordingly, it is an object of the present invention to provide a liquid crystal display device which can realize further sufficient heat radiation efficiency.

To briefly explain the summary of typical inventions among the inventions disclosed in this specification, they are as follows.

A liquid crystal display device comprising: a liquid crystal display panel; and a backlight arranged on a back surface of the liquid crystal display panel, the backlight including a plurality of rod-shaped light sources which is arranged parallel to each other on a back surface side of the liquid crystal display panel, wherein a frame which supports the rod-shaped light sources, heat radiation plate which is arranged on a back surface side of the rod-shaped light sources, through holes are formed in the frame, and heat radiation fins are formed on the heat radiation plate in a state that the heat radiation fins project from a surface of the frame on a side opposite to the liquid crystal display panel through the through holes.

BRIEF DESCRIPTION OF THE DRAWINGS

FIG. 1A and FIG. 1B are constitutional views of an essential part showing a liquid crystal display device of one embodiment according to the present invention, wherein FIG. 1B is a view of a lower frame DF as viewed from a side opposite to a liquid crystal display panel PNL, and FIG. 1A is a cross-sectional view taken along a line a-a in FIG. 1B;

FIG. 2A and FIG. 2B are constitutional view showing the whole liquid crystal display device of one embodiment according to the present invention, wherein FIG. 2A is an exploded view of the liquid crystal display device, and FIG. 2B is an appearance view of assembling of a display device including the liquid crystal display device;

Figure 1A:
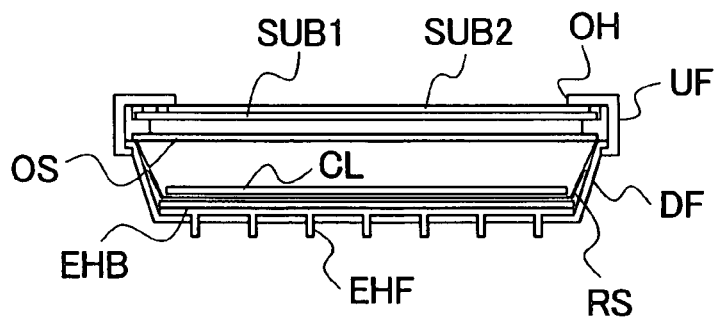

DESCRIPTION OF THE PREFERRED EMBODIMENTS (1) The present invention provides, for example, a liquid crystal display device which at least includes: a liquid crystal display panel; and a backlight arranged on a back surface of the liquid crystal display panel, the backlight including a plurality of rod-shaped light sources which is arranged parallel to each other in plane which faces the liquid crystal display panel in an opposed manner, wherein a frame which supports the rod-shaped light sources, a heat radiation plate arranged on a surface of the frame, through holes are formed in the frame, and heat radiation fins are formed on the heat radiation plate in a state that the heat radiation fins project from a surface of the frame on a side opposite to the liquid crystal display panel through the through holes.

(2) In the liquid crystal display device of the present invention having the constitution (1), for example, a reflection sheet is arranged on a surface of the heat radiation plate on a liquid crystal display panel side.

(3) In the liquid crystal display device of the present invention having the constitution (1), for example, the frame is made of aluminum or iron.

(4) In the liquid crystal display device of the present invention having the constitution (1), for example, a plurality of heat radiation fins are formed on a surface of the heat radiation plate.

(5) In the liquid crystal display device of the present invention having the constitution (4), for example, the liquid crystal display device is used in an erected manner with respect to a horizontal plane, and the heat radiation fins are formed in a shape which extends in the horizontal direction when the heat radiation plate is viewed in a plan view.

(6) In the liquid crystal display device of the present invention having the constitution (4), for example, the liquid crystal display device is used in an erected manner with respect to a horizontal plane, and the heat radiation fins are formed in a shape which extends in the vertical direction when the heat radiation plate is viewed in a plan view.

(7) In the liquid crystal display device of the present invention having the constitution (4), for example, the liquid crystal display device is used in an erected manner with respect to a horizontal plane, and an area that the heat radiation fins occupy on a surface of the heat radiation plate is set such that the area of the heat radiation fins corresponding to an upper portion of the heat radiation plate is large and the area of the heat radiation fins is decreased toward a lower portion of the heat radiation plate.

(8) In the liquid crystal display device of the present invention having the constitution (4), for example, the liquid crystal display device is used in an erected manner with respect to a horizontal plane, a plurality of regions divided in the vertical direction are defined on the heat radiation plate, and an area that the heat radiation fins occupy in each region is larger than an area that the heat radiation fins occupy in the region below each region.

(9) In the liquid crystal display device of the present invention having the constitution (4), for example, number of heat radiation plates in an upper area is more than a lower area.

(10) In the liquid crystal display device of the present invention having the constitution (4), for example, number of the heat radiation plates is gradually decreased from the upper area toward the lower area.

Here, the present invention is not limited to the above-mentioned constitutions, and various modifications can be made without departing from the technical concept of the present invention.

The liquid crystal display device having the above-mentioned constitutions can further enhance the heat radiation efficiency.

Hereinafter, embodiments of a liquid crystal display device according to the present invention are explained in conjunction with drawings.

Figure 2A:
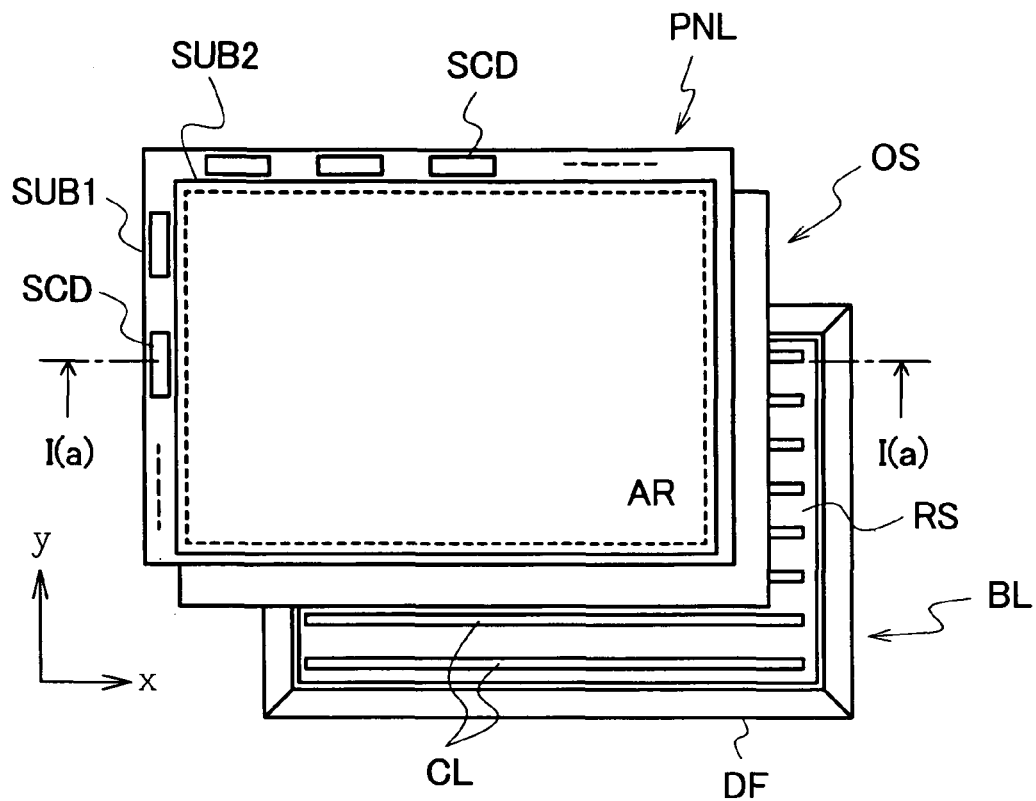

FIG. 2A is a schematic constitutional view showing one embodiment of the liquid crystal display device according to the present invention.

First of all, as viewed from a viewer's side, a liquid crystal display panel PNL, an optical sheet OS and a backlight BL are sequentially arranged.

The liquid crystal display panel PNL is configured such that a pair of substrates SUB1, SUB2 which is arranged parallel to each other and is made of glass, for example, forms an envelope, and liquid crystal is interposed between the respective substrates SUB1, SUB2.

On a liquid-crystal-side surface of the substrate SUB1 or SUB2, pixels arranged in a matrix array (not shown in the drawing) are formed in a state that liquid crystal forms one constitutional element of the pixel, and light transmissivity of the liquid crystal can be controlled for every pixel.

Further, a region on which the respective pixels are formed is referred to as a liquid crystal display region AR (a region surrounded by a dotted-line frame in the drawing), light from a backlight BL described later is radiated to a whole area of the liquid crystal display region AR, and a viewer is allowed to recognize an image using light which passes through the respective pixels.

Here, the substrate SUB1 arranged on a rear side from a viewer's side has an area larger than an area of the substrate SUB2, and semiconductor devices SCD each of which is formed of a circuit for independently driving the respective pixels are mounted on a periphery of the substrate SUB1 exposed from the substrate SUB2.

On a back surface of the liquid crystal display panel PNL, for example, a backlight BL is arranged by way of an optical sheet OS such as a diffusion sheet, a prism sheet or a stacked body of these sheets. The optical sheet OS is provided for guiding light from the backlight BL to a liquid-crystal-display-panel-PNL side by diffusing or condensing light.

The backlight BL is a so-called direct-type backlight. The backlight BL includes a lower frame DF which supports a plurality of rod-shaped light sources CL each of which is formed of, for example, a fluorescent lamp which has the longitudinal direction thereof aligned with the x direction in the drawing and is arranged parallel to each other in the y direction in the drawing in plane parallel to the liquid crystal display panel PNL.

The lower frame DF is made of aluminum or iron, for example, and is formed in a box shape. Side wall surfaces of the lower frame DF are arranged in an inclined manner at an obtuse spreading angle relative to a bottom surface. Treatment such as rust prevention is applied to a surface of the lower frame DF made of such a material. Due to reasons including such treatment, heat conductivity of the lower frame DF is smaller than heat conductivity of a heat radiation plate (indicated by symbol EHB in FIG. 1) described later. The material of the lower frame DF is not always limited to the above-mentioned material and may be resin or the like, for example.

Further, a reflection sheet RS is arranged on a liquid-crystal-display-panel-PNL side of the lower frame DF and on back portions of the rod-shaped light sources CL. Due to such a constitution, light from the rod-shaped light sources CL is reflected on the reflection sheet RS and is directed to the liquid-crystal-display-panel-PNL side.

Figure 2B:
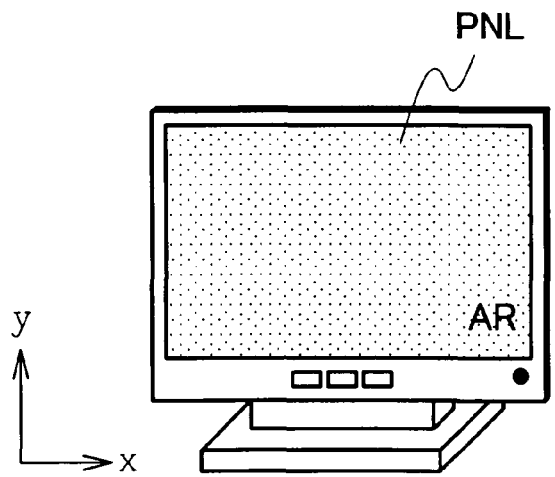

As shown in FIG. 2B, the liquid crystal display device according to the present invention is configured to be used in an erected manner with respect to a horizontal plane. In the liquid crystal display device arranged in such a posture, vertical directions of the liquid crystal display panel PNL, the optical sheet OS and the backlight BL correspond to vertical directions of the liquid crystal display panel PNL, the optical sheet OS and the backlight BL shown in FIG. 2A.

FIG. 1A is a cross-sectional view of the above-mentioned liquid crystal display panel PNL, the optical sheet OS and the backlight BL which are formed into a module using an upper frame UF and a middle frame MF. That is, FIG. 1A shows a cross section of a portion of the module taken along a line I(a)-I(a) in FIG. 2.

In FIG. 1A, a heat radiation plate EHB is arranged on a bottom surface (liquid-crystal-display-panel-PNL-side surface) of the lower frame DF in a state that the heat radiation plate EHB avoids portions of the bottom surface where the rod-shaped light sources CL are supported. The heat radiation plate EHB is made of a material which exhibits larger heat conductivity than the material of the lower frame DF, for example. Further, although described in detail later, heat radiation fins EHF are formed on the heat radiation plate EHB in a state that the heat radiation fins EHF project from a surface of the lower frame DF on a side opposite to the liquid crystal display panel PNL through slits (indicated by symbol SL in FIG. 1B) formed in the lower frame DF.

Here, the reflection sheet RS is arranged on the liquid-crystal-display-panel-PNL-side surface of the heat radiation plate EHB. The reflection sheet RS is arranged while avoiding positions where the rod-shaped light sources CL are supported on the lower frame DF.

The liquid crystal display panel PNL is mounted on a middle frame MF, and the optical sheet OS is sandwiched between the middle frame MF and the lower frame DF. Further, the middle frame MF is covered with an upper frame UF. The upper frame UF forms an opening OH in a portion thereof which faces the above-mentioned liquid crystal display region AR of the liquid crystal display panel PNL and, at the same time, is engaged with the lower frame DF.

Figure 1B:
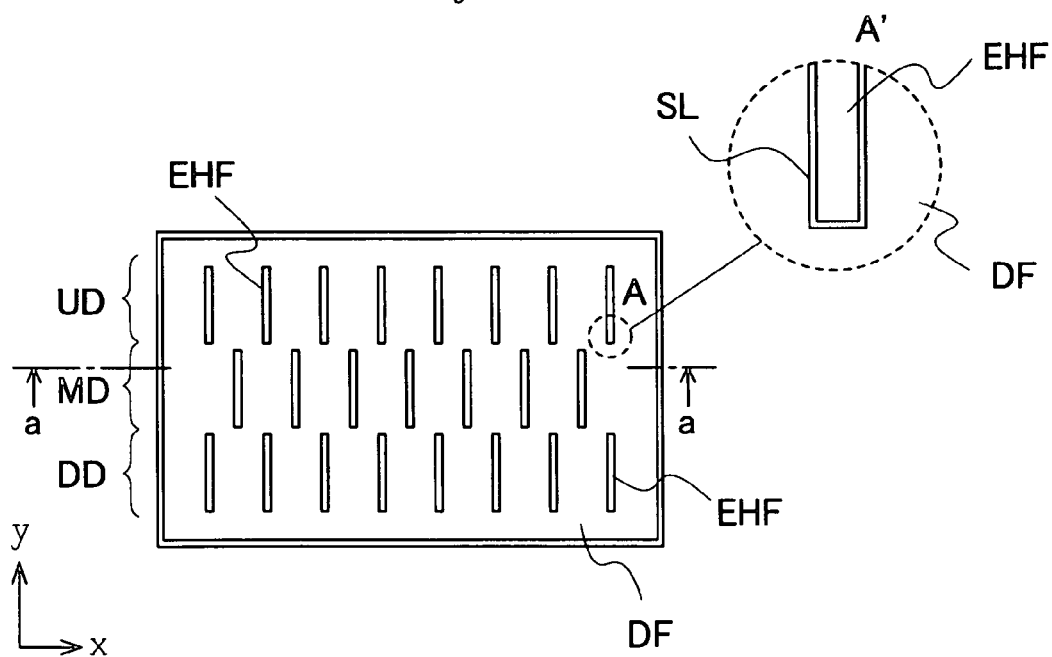

FIG. 1B is a view of the lower frame DF as viewed from a surface of the lower frame DF on a side opposite to the liquid crystal display panel PNL. Here, the above-mentioned FIG. 1A is a cross-sectional view taken along a line a-a in FIG. 1B.

With respect to the respective heat radiation fins EHF arranged on the surface of the lower frame DF, for example, as shown in an enlarged view A' which shows a portion of the heat radiation plate EHB surrounded by a dotted circular frame A in FIG. 1B, each heat radiation fin EHF projects through a slit SL formed in the lower frame DF. Further, these respective heat radiation fins EHF are, as described previously, integrally formed with the heat radiation plate EHB arranged on the liquid-crystal-display-panel-PNL-side surface of the lower frame DF.

Here, an upper portion of the lower frame DF shown in FIG. 1B corresponds to, in a state that the liquid crystal display device is used in an erected manner with respect to a horizontal plane, an upper portion of the liquid crystal display device.

In this case, the lower frame DF is divided into three regions consisting of an upper region UD, a center region MD and a lower region DD, for example, from the upper portion to a lower portion thereof. The heat radiation fins EHF are formed in the respective regions UD, MD and DD such that the heat radiation fins EHF which respectively extend in the vertical direction (y direction in the drawing) are arranged parallel to each other in the horizontal direction (x direction in the drawing). The respective heat radiation fins in each region are arranged at equal intervals. Further, the respective heat radiation fins in the center region are arranged with the displacement of a half pitch relative to the respective heat radiation fins formed in the respective upper and lower regions. Such arrangement is adopted for arranging the respective heat radiation fins on the surface of the lower frame DF in an approximately uniformly scattered manner.

FIG. 3A to FIG. 3D are cross-sectional views showing the respective examples of the constitutions of the heat radiation plate EHB and the heat radiation fins EHF.

Figure 3A:
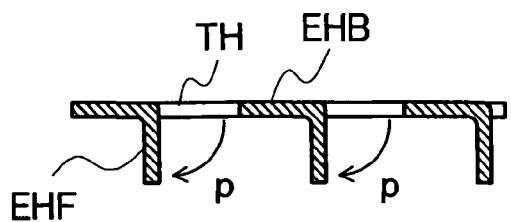
FIG. 3A to FIG. 3F are constitutional views showing one embodiment of a heat radiation plate and heat radiation fins which are provided to the liquid crystal display device according to the present invention.

In the example shown in FIG. 3A, the heat radiation fin EHF is formed by cutting and raising a portion of the heat radiation plate EHB formed in a planar shape. For example, as shown in FIG. 3E, a U-shaped slit is formed in a flat plate, and a tongue portion EHF1 formed by the slit is bent perpendicular to the heat radiation plate EHB. The tongue portion is used as a heat radiation fin EHF. Here, the respective slits have the same shape along the parallel arrangement direction of the slits and hence, the respective tongue portions have the same raising directions (p direction indicated by an arrow in the drawing). Here, holes TH are formed in portions of the heat radiation plate EHB corresponding to the tongue portions before being raised.

Figure 3B:
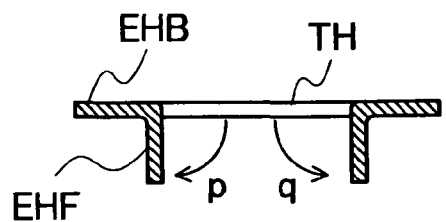

In the example shown in FIG. 3B, the heat radiation fin EHF is formed by cutting and raising a portion of the heat radiation plate EHB formed in a planar shape. For example, as shown in FIG. 3F, an H-shaped slit is formed in the heat radiation plate EHB, and a pair of oppositely facing tongue portions of the heat radiation plate EHB which is formed by the slit is respectively opened like a double hinged door with respect to the heat radiation plate EHB (p, q directions indicated by arrows in the drawing) thus bending the tongue portions perpendicular to the heat radiation plate EHB. The respective tongue portions are used as the heat radiation fins EHF. Here, holes TH are formed in portions of the heat radiation plate EHB corresponding to the respective tongue portions before being raised.

Figure 3C:
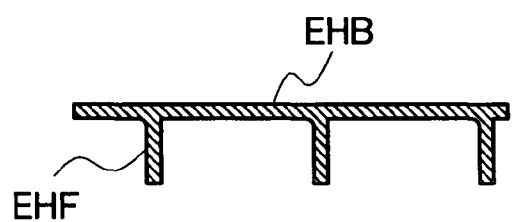

In the example shown in FIG. 3C, the heat radiation plate EHB and the heat radiation fins EHF are integrally formed. Different from the examples shown in FIG. 3A and FIG. 3B, the example shown in FIG. 3C has no hole TH which is formed by raising the respective tongue portions in the heat radiation plate EHB and hence, the example shown in FIG. 3C acquires an advantageous effect that the heat conduction of the heat radiation plate EHB can be performed more efficiently.

Figure 3D:
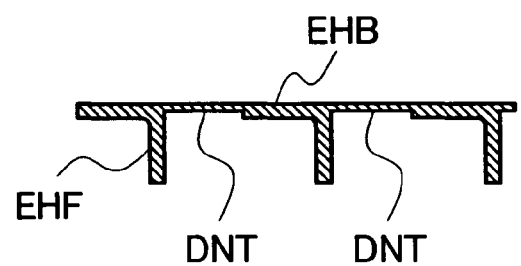
Figure 3E:
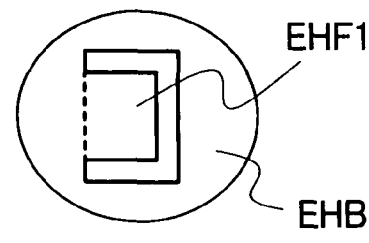
Figure 3F:
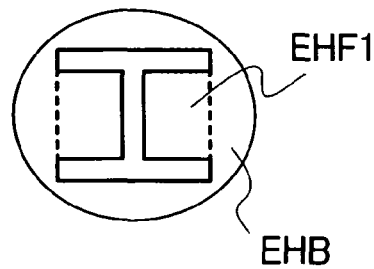

In the example shown in FIG. 3D, in the same manner as the example shown in FIG. 3C, the heat radiation plate EHB and the heat radiation fins EHF are integrally formed. Recessed portions DNT are formed on a heat-radiation-fin-EHF-side surface of the heat radiation plate EHB. Due to the formation of these recessed portions DNT, a surface area of the heat radiation plate EHB can be increased thus further enhancing the heat radiation efficiency.

Although the heat radiation plate EHB and the heat radiation fins EHF are made of the same material as shown in FIG. 3A to FIG. 3D, the heat radiation plate EHB and the heat radiation fins EHF may be made of different materials.

This is because the heat radiation effect can be further enhanced by selecting the respective materials of the heat radiation plate EHB and the heat radiation fins EHF such that their heat conductivities become larger than the heat conductivity of a material of the lower frame DF.

In the liquid crystal display device having such a constitution, the heat radiation plate EHB is arranged to face the respective rod-shaped light sources CL on a bottom surface of the lower frame DF thus facilitating the transfer of the most of heat generated by the rod-shaped light sources CL to the heat radiation plate EHB.

Further, the heat radiation fins EHF are integrally mounted on the heat radiation plate EHB, and the heat radiation fins EHF project from a surface of the lower frame DF on a side opposite to the liquid crystal display panel PNL through the slits SL formed in the lower frame DF. Accordingly, heat transferred to the heat radiation plate EHB is directly led to the heat radiation fins EHF without being transferred through the above-mentioned lower frame DF.

Accordingly, the heat radiation plate EHB and the heat radiation fins EHF can be formed by selecting materials which exhibit favorable heat conductivities irrelevant to the lower frame DF thus further enhancing the heat radiation efficiency.

Figure 4A:
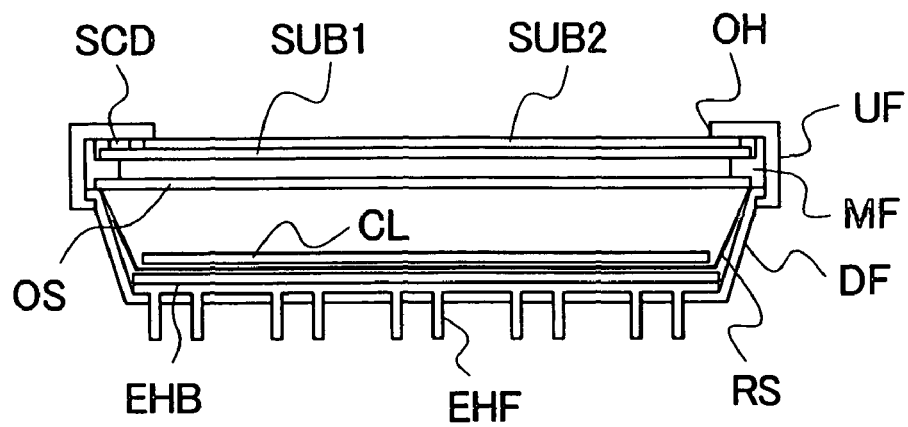
FIG. 4A and FIG. 4B are constitutional views of an essential part of a liquid crystal display device of another embodiment according to the present invention.
Figure 4B:
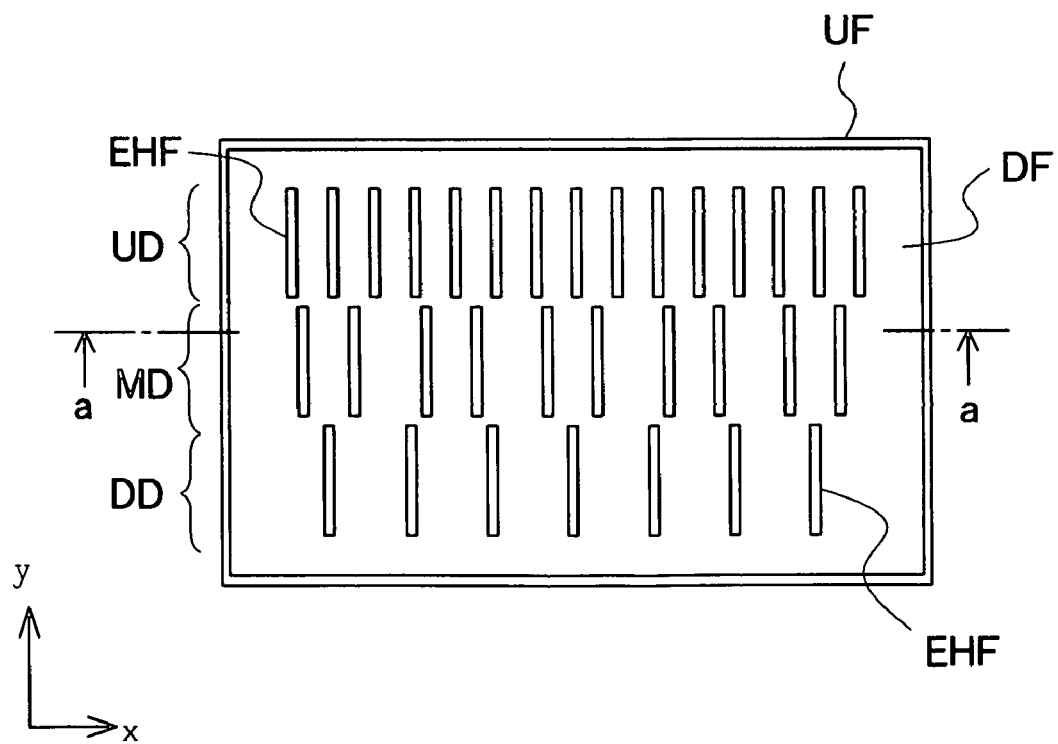

FIG. 4A and FIG. 4B are constitutional views showing another embodiment of the liquid crystal display device according to the present invention, and correspond to FIG. 1A and FIG. 1B.

The constitution which makes the example shown in FIG. 4A and FIG. 4B different from the example shown in FIG. 1A and FIG. 1B lies in an arrangement state of the heat radiation fins EHF with respect to a surface of the lower frame DF.

That is, when the liquid crystal display device is used in an erected manner with respect to a horizontal surface, with respect to the heat radiation fins in respective regions divided from above to below, the heat radiation fins are arranged densely in an upper region, and the arrangement of the heat radiation fins becomes sequentially coarser toward the lower region. For example, the largest number of the heat radiation fins is arranged in the upper region UD, the number of heat radiation fins less than the number of heat radiation fins in the upper region UD is arranged in the center region MD, and the number of heat radiation fins less than the number of heat radiation fins in the center region MD is arranged in the lower region DD.

Heat generated by a backlight is collected on an upper side of the backlight so that a temperature of the liquid crystal display device is increased from a lower portion to an upper portion of the liquid crystal display device. The number of heat radiation fins EHF is increased by taking such a phenomenon into consideration thus further enhancing the heat radiation efficiency.

Further, in the above-mentioned embodiment, the heat radiation fins are arranged to extend in an elongated manner in the vertical direction when the display panel is used in an erected manner. By adopting such an arrangement, it is possible to form paths of airflow directing from a lower side to an upper side of the display device thus acquiring the further enhanced heat radiation effect.

Further, since the heat radiation fins are longitudinally elongated, it is possible to prevent dusts from being stacked on the heat radiation fins.

Figure 5A:
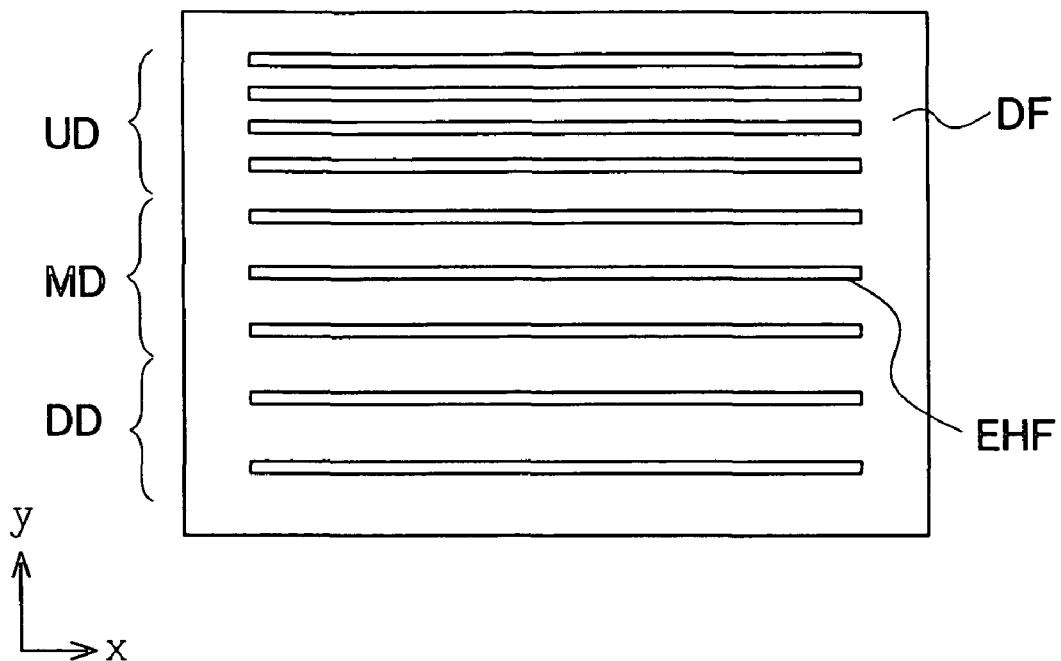
FIG. 5A and FIG. 5B are constitutional views of an essential part of a liquid crystal display device of another embodiment according to the present invention.

FIG. 5A is a constitutional view showing another embodiment of the liquid crystal display device according to the present invention, and corresponds to FIG. 1B.

The constitution which makes the example shown in FIG. 5A different from the example shown FIG. 1A lies in the extending direction of the heat radiation fins EHF.

That is, when a liquid crystal display device is used in an erected manner with respect to a horizontal plane, a plurality of heat radiation fins EHF extend in the horizontal direction (x direction in the drawing) from a left end to a right end of a lower frame DF, and are arranged parallel to each other in the vertical direction (y direction in the drawing).

In this embodiment, with respect to the heat radiation fins EHF in respective regions UD, MD and DD which are formed by dividing the lower frame DF into three portions ranging from an upper portion to a lower portion, for example, the heat radiation fins are arranged densely in the upper region, and the arrangement of the heat radiation fins becomes sequentially coarser toward the lower region. In the example shown in FIG. 5A, four heat radiation fins EHF are arranged in the upper region UD of the lower frame, three heat radiation fins EHF are arranged in the center region MD, and two heat radiation fins EHF are arranged in the lower region DD.

Figure 5B:
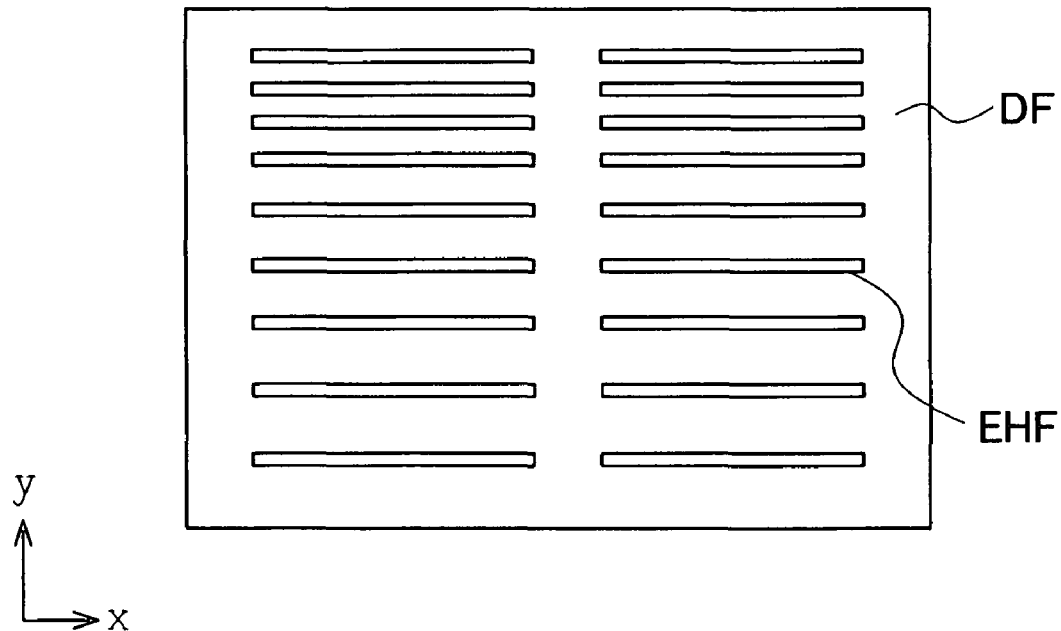

Further, FIG. 5B is a constitutional view showing another embodiment of the liquid crystal display device according to the present invention, and corresponds to FIG. 5A.

The constitution which makes the example shown in FIG. 5B different from the example shown in FIG. 5A lies in that respective heat radiation fins which extend in the horizontal direction are arranged in a state that the respective heat radiation fins are divided in a plural number (two in the drawing) in the horizontal direction.

In this embodiment, when the liquid crystal display device is used in an erected manner with respect to the horizontal plane, the respective heat radiation fins EHF are arranged such that the heat radiation fins EHF are arranged densely in an upper portion of a lower frame DF and the arrangement of the heat radiation fins EHF becomes coarser from the upper portion to a lower portion of the lower frame DF. In this case, the number of heat radiation fins EHF in respective portions of the lower frame ranging from the upper portion to the lower portion may be set equal without changing the number of heat radiation fins EHF for every portion and areas of the respective heat radiation fins EHF may be decreased from the upper portion to the lower portion of the lower frame DF. This is because these modifications can also acquire the substantially equal advantageous effects.

That is, by decreasing occupying areas of the respective heat radiation fins EHF with respect to the lower frame DF in order from the upper portion to the lower portion of the lower frame DF as viewed in a plan view, these modifications can also acquire the substantially equal advantageous effects.

Further, in the above-mentioned embodiments, the heat radiation plate EHB arranged on the liquid-crystal-display-panel-PNL side of the lower frame DF is formed of a single plate which covers the substantially whole region of the lower frame DF. However, the heat radiation plate EHB is not limited to such constitution, and the heat radiation plate EHB which is divided in two or more may be arranged.

The above-mentioned respective embodiments may be adopted in a single form or in combination. This is because the advantageous effect of the respective embodiments can be acquired independently or synergistically.

What is claimed is:

1. A liquid crystal display device, comprising:
a liquid crystal display panel; and
a backlight arranged on a back surface of the liquid crystal display panel, the backlight including a plurality of rod-shaped light sources having a longitudinal axis extending in a horizontal direction, and which are arranged parallel to each other in a vertical direction on a back surface side of the liquid crystal display panel, wherein
a frame which supports the rod-shaped light sources, a heat radiation plate which is arranged on a back surface side of the rod-shaped light sources,
through holes are formed in the frame, and heat radiation fins are formed on the heat radiation plate in a state that the heat radiation fins project from a surface of the frame on a side opposite to the liquid crystal display panel through the through holes,
the heat radiation fins are formed by cutting and raising a portion of, the heat radiation plate of planar shape,
the heat radiation fins having a longitudinal axis extending in the vertical direction and a latitudinal axis extending in the horizontal direction, the heat radiation fins arranged parallel to each other along the longitudinal axis and in the vertical direction.

2. A liquid crystal display device according to claim 1, wherein a reflection sheet is arranged on a surface of the heat radiation plate on a liquid crystal display panel side.

3. A liquid crystal display device according to claim 1, wherein the frame is made of aluminum or iron.

4. A liquid crystal display device according to claim 1, wherein a plurality of heat radiation fins are formed on a surface of the heat radiation plate.

5. A liquid crystal display device according to claim 4, wherein the liquid crystal display device is used in an erected manner with respect to a horizontal plane, and the heat radiation fins are formed in a shape which extends in the horizontal direction.

6. A liquid crystal display device according to claim 4, wherein the liquid crystal display device is used in an erected manner with respect to a horizontal plane, and the heat radiation fins are formed in a shape which extends in the vertical direction.

7. A liquid crystal display device according to claim 4, wherein the liquid crystal display device is used in an erected manner with respect to a horizontal plane, a plurality of regions divided in the vertical direction are defined on the heat radiation plate, and an area that the heat radiation fins occupy in each region is larger than an area that the heat radiation fins occupy in the region below said each region.

8. A liquid crystal display device according to claim 4, wherein the liquid crystal display device is used in an erected manner with respect to a horizontal plane, and number of the heat radiation fins in an upper area is more than a lower area.

9. A liquid crystal display device according to claim 8, wherein the number of the heat radiation fins is gradually decreased from the upper area toward the lower area.

* * * * *